US010243725B2

(12) United States Patent
Zhao et al.

(10) Patent No.: US 10,243,725 B2
(45) Date of Patent: Mar. 26, 2019

(54) APPARATUS AND METHOD FOR GENERATING TRANSMITTING SEQUENCE, TRAINING SEQUENCE SYNCHRONIZATION APPARATUS AND METHOD, APPARATUS AND METHOD FOR ESTIMATING CHANNEL SPACING AND SYSTEM

(71) Applicant: Fujitsu Limited, Kawasaki-shi, Kanagawa (JP)

(72) Inventors: Ying Zhao, Beijing (CN); Liang Dou, Beijing (CN); Zhenning Tao, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/454,245

(22) Filed: Mar. 9, 2017

(65) Prior Publication Data

US 2017/0272232 A1 Sep. 21, 2017

(30) Foreign Application Priority Data

Mar. 18, 2016 (CN) .......................... 2016 1 0157773

(51) Int. Cl.
*H04L 7/00* (2006.01)
*H04L 7/04* (2006.01)
(Continued)

(52) U.S. Cl.
CPC ............. *H04L 7/041* (2013.01); *H04B 10/00* (2013.01); *H04L 7/0041* (2013.01); *H04L 7/0087* (2013.01); *H04L 7/10* (2013.01)

(58) Field of Classification Search
CPC ..... H04B 10/00; H04L 7/0041; H04L 7/0066; H04L 7/007; H04L 7/0079; H04L 7/0087;
(Continued)

(56) References Cited

U.S. PATENT DOCUMENTS 5,140,619 A * 8/1992 Aubie ..................... H04L 7/042
370/304
5,363,412 A * 11/1994 Love ...................... H03M 13/41
375/341
(Continued)

*Primary Examiner* — Young T Tse
(74) *Attorney, Agent, or Firm* — Staas & Halsey LLP

(57) ABSTRACT

Embodiments of this disclosure provide an apparatus and method for generating a transmitting sequence, a training sequence synchronization apparatus and method, an apparatus and method for estimating channel spacing and a system. The training sequence synchronization apparatus includes: a delay correlation processing unit configured to parallelly perform autocorrelation operations of different delay amounts on a receiving sequence containing a periodic training sequence to obtain multiple parallel correlation sequences; a superimposition processing unit configured to perform a superimposition operation on the multiple parallel correlation sequences to obtain a synchronization correlation sequence; and a synchronization extracting unit configured to perform a synchronization position extraction on the synchronization correlation sequence to obtain a synchronization position of the training sequence. With the embodiments of this disclosure, anti-noise performance of the training sequence may be enhanced.

9 Claims, 6 Drawing Sheets

(51) Int. Cl.
*H04L 7/10* (2006.01)
*H04B 10/00* (2013.01)
(58) Field of Classification Search
CPC ......... H04L 7/027; H04L 7/041; H04L 7/042; H04L 7/043; H04L 7/06; H04L 7/10
USPC ....... 375/268, 320, 326, 343, 354–356, 362, 375/364, 367; 370/350, 503, 515
See application file for complete search history.

(56) References Cited

U.S. PATENT DOCUMENTS

| | | | | |
|---|---|---|---|---|
| 5,373,507 | A * | 12/1994 | Skold | H04L 7/042 370/347 |
| 5,596,582 | A * | 1/1997 | Sato | H04L 27/2657 370/203 |
| 5,680,421 | A * | 10/1997 | Shiino | H04L 7/042 370/350 |
| 2004/0190438 | A1* | 9/2004 | Maltsev | H04L 27/266 370/206 |
| 2007/0002937 | A1* | 1/2007 | Min | H04B 1/708 375/150 |
| 2009/0304128 | A1* | 12/2009 | Izumi | H04L 7/042 375/343 |
| 2012/0027419 | A1* | 2/2012 | Kaneda | H04B 10/516 398/158 |
| 2017/0104643 | A1* | 4/2017 | Zhao | H04L 7/0087 |
| 2017/0195155 | A1* | 7/2017 | Zhang | H04L 5/0007 |
| 2017/0272279 | A1* | 9/2017 | Zhao | H04L 25/0224 |
| 2017/0279526 | A1* | 9/2017 | Bownass | H04B 10/0795 |
| 2017/0310440 | A1* | 10/2017 | Li | H04L 5/0048 |

* cited by examiner

APPARATUS AND METHOD FOR GENERATING TRANSMITTING SEQUENCE, TRAINING SEQUENCE SYNCHRONIZATION APPARATUS AND METHOD, APPARATUS AND METHOD FOR ESTIMATING CHANNEL SPACING AND SYSTEM

CROSS-REFERENCE TO RELATED APPLICATIONS

This application claims the benefit of Chinese Application No. 201610157773.X, filed Mar. 18, 2016, in the Chinese Intellectual Property Office, the disclosure of which is incorporated herein by reference.

BACKGROUND

1. Field

This disclosure relates to the field of communication technologies, and in particular to an apparatus and method for generating a transmitting sequence, a training sequence synchronization apparatus and method, an apparatus and method for estimating channel spacing and a system.

2. Description of the Related Art

Currently, a training sequence plays an important role in a high-speed optical fiber communication system. First, as optical fiber channels are not ideal, it is often needed to introduce a training sequence to assist the receiver in performing channel equalization. Second, the training sequence may further be used to assist in performing performance detection, and frequency offset estimation, etc. While processing based on the training sequence is performed on the premise of extraction (synchronization) of the training sequence, in view of the important role of the synchronization processing of the training sequence, an effective training sequence design and a synchronization method become keys in improving a performance of the transmission system.

Under a nonideal condition, system noise is a key factor influencing the performance of synchronization of the training sequence, an effective training sequence design and a processing method may enhance anti-noise characteristic of the training sequence, and improvement of the anti-noise characteristic is not only beneficial to extraction of a synchronization position, but also brings about enhancement of several functions of the training sequence, so that the whole system has a good communication performance.

It should be noted that the above description of the background is merely provided for clear and complete explanation of this disclosure and for easy understanding by those skilled in the art. And it should not be understood that the above technical solution is known to those skilled in the art as it is described in the background of this disclosure.

SUMMARY

Additional aspects and/or advantages will be set forth in part in the description which follows and, in part, will be apparent from the description, or may be learned by practice of the invention.

It was found by the inventors that solving the anti-noise problem of the training sequences is a basis for the design and the synchronization of the training sequence, and is also effective means for further optimizing the optical fiber communication system. During achieving enhancement of anti-noise of the synchronization of the training sequence, it is not desired to introduce extra hardware overhead. Hence, it is a starting point of this application that effective digital signal processing is performed at an optical receiver, the anti-noise characteristic of the training sequence is enhanced without introducing much complexity, and performance of the training sequence in synchronization is improved.

Embodiments of this disclosure provide an apparatus and method for generating a transmitting sequence, a training sequence synchronization apparatus and method, an apparatus and method for estimating a channel spacing and a system. Using information in the optical receiver, the training sequence synchronization apparatus performs an extraction on a training sequence with periodicity, and enhances an anti-noise characteristic of the training sequence by using characteristic of multi-period repetition, thereby outstandingly improving the anti-noise characteristic of the training sequence.

According to a first aspect of the embodiments of this disclosure, there is provided an apparatus for generating a transmitting sequence, including:

a generating unit configured to insert a periodic training sequence into transmitting data, so as to obtain a transmitting sequence; wherein, the periodic training sequence includes multiple repeated sub-sequences, the sub-sequences being connected to each other in an end-to-end manner to constitute the periodic training sequence.

According to a second aspect of the embodiments of this disclosure, there is provided a training sequence synchronization apparatus, including:

a delay correlation processing unit configured to parallelly perform autocorrelation operations of different delay amounts on a receiving sequence containing a periodic training sequence to obtain multiple parallel correlation sequences;

a superimposition processing unit configured to perform a superimposition operation on the multiple parallel correlation sequences to obtain a synchronization correlation sequence; and a synchronization extracting unit configured to perform a synchronization position extraction on the synchronization correlation sequence to obtain a synchronization position of the training sequence.

According to a third aspect of the embodiments of this disclosure, there is provided an apparatus for estimating a channel spacing, including:

a synchronizing unit configured to parallelly perform autocorrelation operations of different delay amounts on a receiving sequence of a center channel containing a periodic training sequence to obtain multiple parallel correlation sequences, perform a superimposition operation on the multiple parallel correlation sequences to obtain a synchronization correlation sequence, perform a synchronization position extraction on the synchronization correlation sequence to obtain a synchronization position of the training sequence of the center channel; and parallelly perform autocorrelation operations of different delay amounts on a receiving sequence of a neighboring channel containing a periodic training sequence to obtain multiple parallel correlation sequences, perform a superimposition operation on the multiple parallel correlation sequences to obtain a synchronization correlation sequence, perform a synchronization position extraction on the synchronization correlation sequence to obtain a synchronization position of the training sequence of the neighboring channel;

a first estimating unit configured to estimate a frequency offset of the center channel by using the synchronization position of the training sequence of the center channel, and estimate a frequency offset of the neighboring channel by using the synchronization position of the training sequence of the neighboring channel; and a second estimating unit configured to estimate a channel spacing by using the frequency offset of the center channel and the frequency offset of the neighboring channel.

According to a fourth aspect of the embodiments of this disclosure, there is provided a transmitter, including the apparatus as described in the first aspect.

According to a fifth aspect of the embodiments of this disclosure, there is provided a receiver, including the apparatus as described in the second or the third aspect.

According to a sixth aspect of the embodiments of this disclosure, there is provided a communication system, including the transmitter as described in the fourth aspect and the receiver as described in the fifth aspect.

According to a seventh aspect of the embodiments of this disclosure, there is provided a method for generating a transmitting sequence, including:

inserting a periodic training sequence into transmitting data, so as to obtain a transmitting sequence; wherein, the periodic training sequence comprises multiple repeated sub-sequences, the sub-sequences being connected to each other in an end-to-end manner to constitute the periodic training sequence.

According to an eighth aspect of the embodiments of this disclosure, there is provided a training sequence synchronization method, including:

parallelly performing autocorrelation operations of different delay amounts on a receiving sequence containing a periodic training sequence to obtain multiple parallel correlation sequences;

performing a superimposition operation on the multiple parallel correlation sequences to obtain a synchronization correlation sequence; and performing a synchronization position extraction on the synchronization correlation sequence to obtain a synchronization position of the training sequence.

According to a ninth aspect of the embodiments of this disclosure, there is provided a method for estimating a channel spacing, including:

parallelly performing autocorrelation operations of different delay amounts on a receiving sequence of a center channel containing a periodic training sequence to obtain multiple parallel correlation sequences, performing a superimposition operation on the multiple parallel correlation sequences to obtain a synchronization correlation sequence, performing a synchronization position extraction on the synchronization correlation sequence to obtain a synchronization position of the training sequence of the center channel;

parallelly performing autocorrelation operations of different delay amounts on a receiving sequence of a neighboring channel containing a periodic training sequence to obtain multiple parallel correlation sequences, performing a superimposition operation on the multiple parallel correlation sequences to obtain a synchronization correlation sequence, and performing a synchronization position extraction on the synchronization correlation sequence to obtain a synchronization position of the training sequence of the neighboring channel;

estimating a frequency offset of the center channel by using the synchronization position of the training sequence of the center channel;

estimating a frequency offset of the neighboring channel by using the synchronization position of the training sequence of the neighboring channel; and estimating a channel spacing by using the frequency offset of the center channel and the frequency offset of the neighboring channel.

An advantage of the embodiments of this disclosure exists in that with the embodiments of this disclosure, anti-noise characteristic of the training sequence may be enhanced by using multi-period repeated training sequence, and such effective processing is beneficial to improvement of the transmission performance of the optical receiver, and provides instructions to production of optical receiver modules.

With reference to the following description and drawings, the particular embodiments of this disclosure are disclosed in detail, and the principles of this disclosure and the manners of use are indicated. It should be understood that the scope of the embodiments of this disclosure is not limited thereto. The embodiments of this disclosure contain many alternations, modifications and equivalents within the scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprises/comprising includes/including" when used in this specification is taken to specify the presence of stated features, integers, steps or components but does not preclude the presence or addition of one or more other features, integers, steps, components or groups thereof.

BRIEF DESCRIPTION OF THE DRAWINGS

The drawings are included to provide further understanding of this disclosure, which constitute a part of the specification and illustrate the exemplary embodiments of this disclosure, and are used for setting forth the principles of this disclosure together with the description. It is clear and understood that the accompanying drawings in the following description are some embodiments of this disclosure, and for those of ordinary skills in the art, other accompanying drawings may be obtained according to these accompanying drawings without making an inventive effort. In the drawings.

DETAILED DESCRIPTION

These and further aspects and features of the present disclosure will be apparent with reference to the following description and attached drawings. In the description and drawings, particular embodiments of the disclosure have been disclosed in detail as being indicative of some of the ways in which the principles of the disclosure may be employed, but it is understood that the disclosure is not limited correspondingly in scope. Rather, the disclosure includes all changes, modifications and equivalents coming within the terms of the appended claims.

Embodiments of this disclosure shall be described below with reference to the accompanying drawings and particular implementations.

Embodiment 1

An embodiment of this disclosure provides an apparatus for generating a transmitting sequence, configured in a transmitter in a communication system, for generating a transmitting sequence containing a periodic training sequence, so as to improve an anti-noise characteristic of the training sequence.

Figure 1:
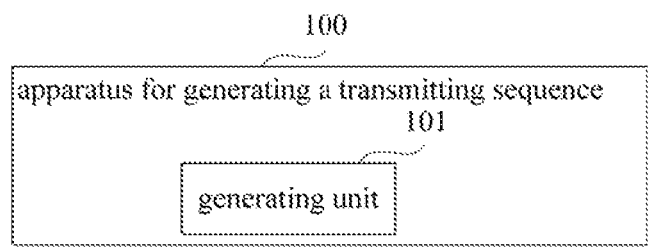
FIG. 1 is a schematic diagram of the apparatus for generating a transmitting sequence of Embodiment 1.

FIG. 1 is a schematic diagram of the apparatus 100 for generating a transmitting sequence. Referring to FIG. 1, the apparatus 100 includes: a generating unit 101 configured to insert a periodic training sequence into transmitting data to obtain a transmitting sequence. In this embodiment, the periodic training sequence includes multiple repeated sub-sequences, the sub-sequences being connected in an end-to-end manner to constitute the periodic training sequence.

Figure 2:
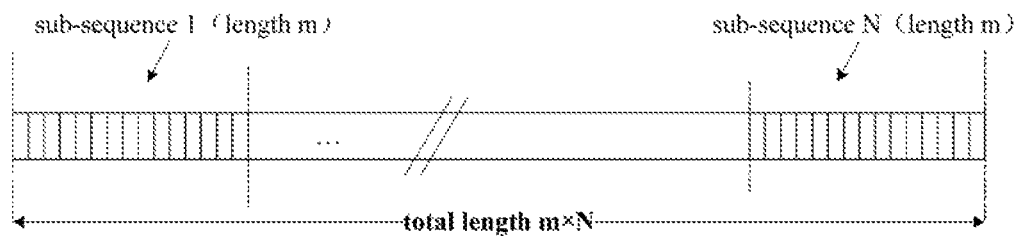
FIG. 2 is a schematic diagram of a structure of a periodic training sequence.

FIG. 2 is a schematic diagram of a structure of an implementation of the periodic training sequence. As shown in FIG. 2, in this implementation, the training sequence includes N repeated sub-sequences, the sub-sequences being connected in an end-to-end manner to constitute the periodic training sequence, and each sub-sequences containing m data symbols. N is not limited in this embodiment, which may be equal to 1, and may be preferably greater than 10. And m is also not limited in this embodiment. Hence, a periodic training sequence of a period m is constituted.

In this implementation, data may be inserted between the sub-sequences, and there may also be no data between the sub-sequences. If data are inserted, the periodicity of the sub-sequences needs to be ensured, that is, the inserted data need also possessing periodicity. And furthermore, structures of the sub-sequences are not limited in this embodiment, which may be conventional sequence structures, and may also be designed independently.

In this implementation, the periodic training sequence may be all of whole training sequence, and may also be a part of the whole training sequence. If the periodic training sequence is a part of the whole training sequence, a structure of a training sequence at another position is not limited in this embodiment. For example, the training sequence at another position may be periodic, and may also be aperiodic.

After generating the transmitting sequence by the apparatus of this embodiment, the transmitter may transmit the transmitting sequence in a conventional manner. Hence, a receiving sequence received by a receiver contains the periodic training sequence, and after being extracted, the periodic training sequence may be used for subsequent processing, such as channel spacing estimation, and channel equalization, etc.

With the design of the training sequence inserted into the transmitting data in this embodiment, an anti-noise performance of the training sequence may be improved by using the periodically repeated characteristic. And a constraint of periodical repetition is only introduced, and freedom of design of the training sequence (sub-sequences) is kept to a great extent, which may facilitate achievement of other functions. Hence, viewing from the angle of flexible application, relatively sufficient design freedom is kept by the training sequence of such a structure.

Embodiment 2

An embodiment of this disclosure provides a training sequence synchronization apparatus, which is configured in a receiver, performs an extraction on a training sequence with periodicity by using information in the receiver, and then enhances an anti-noise characteristic of the training sequence by using characteristic of multi-period repetition.

Figure 3:
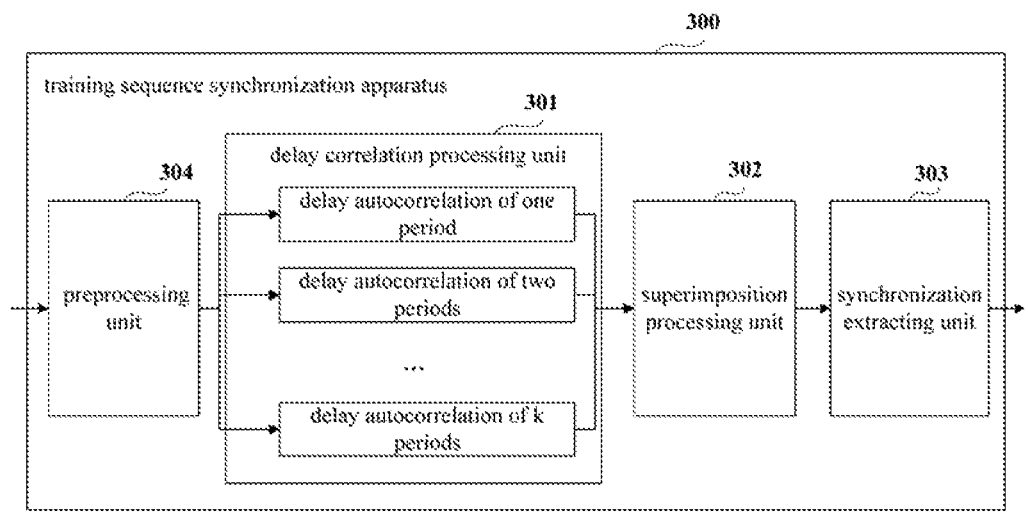
FIG. 3 is a schematic diagram of the training sequence synchronization apparatus of Embodiment 2.

FIG. 3 is a schematic diagram of the training sequence synchronization apparatus 300. Referring to FIG. 3, the apparatus 300 includes: a delay correlation processing unit 301, a superimposition processing unit 302 and a synchronization extracting unit 303. The delay correlation processing unit 301 is configured to parallelly perform autocorrelation operations of different delay amounts on a receiving sequence containing a periodic training sequence to obtain multiple parallel correlation sequences. The superimposition processing unit 302 is configured to perform a superimposition operation on the multiple parallel correlation sequences to obtain a synchronization correlation sequence. And the synchronization extracting unit 303 is configured to perform a synchronization position extraction on the synchronization correlation sequence to obtain a synchronization position of the training sequence.

Figure 4:
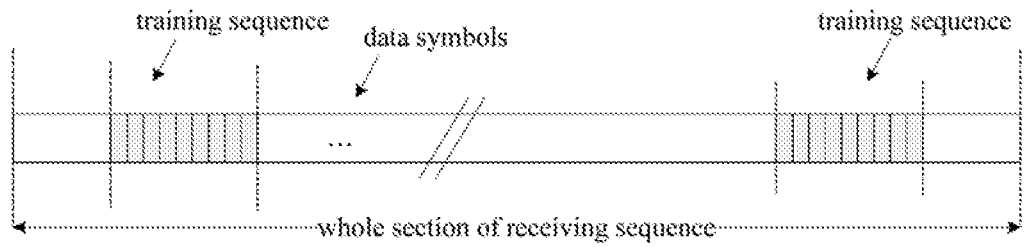
FIG. 4 is a schematic diagram of a structure of a receiving sequence.

In this embodiment, a signal received by the receiver (referred to as a receiving sequence in brief) is as shown in FIG. 4. In this embodiment, the training sequence occupies a small part of the receiving sequence, and as a position of the training sequence is unknown, the apparatus of the embodiment of this disclosure processes a whole receiving sequence of the receiver. In this embodiment, the whole receiving sequence contains the periodic training sequence as described in Embodiment 1, the structure of which being incorporated herein, and being not going to be described herein any further.

In this embodiment, as shown in FIG. 3, alternatively, the apparatus 300 may further include a preprocessing unit 304, which is shown in a dotted block diagram in FIG. 3. The preprocessing unit 304 is configured to preprocess the receiving sequence containing the periodic training sequence to obtain the preprocessed receiving sequence and provide it to the delay correlation processing unit 301. In this embodiment, after the whole receiving sequence is obtained, the receiving sequence may be first preprocessed by the preprocessing unit 304, so as to selectively perform such processing as denoising, demultiplexing, and pre-equalization, etc.

In this embodiment, such existing operations as IQ imbalance elimination, polarization demultiplexing, out-of-band noise filtering, and pre-equalization, etc., may be taken into account in the preprocessing on the receiving sequence, which is not limited in this embodiment. A preprocessing method of the preprocessing unit 304 shall be described below by way of two examples.

Figure 5:
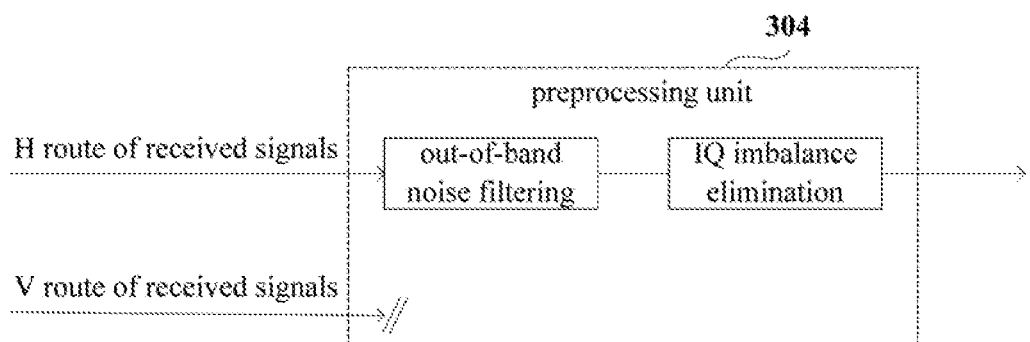
FIG. 5 is a schematic diagram of an implementation of a preprocessing unit.

FIG. 5 is a schematic diagram of an implementation of the preprocessing unit 304. As shown in FIG. 5, the received signals of the receiver are two routes, H and V routes, of signals. As synchronization information may only be extracted by one route of signal, one of the H route and the V route may be discarded. The reserved route of signal is taken as output of the preprocessing unit 304 after being performed out-of-band noise filtering and IQ imbalance elimination.

Figure 6:
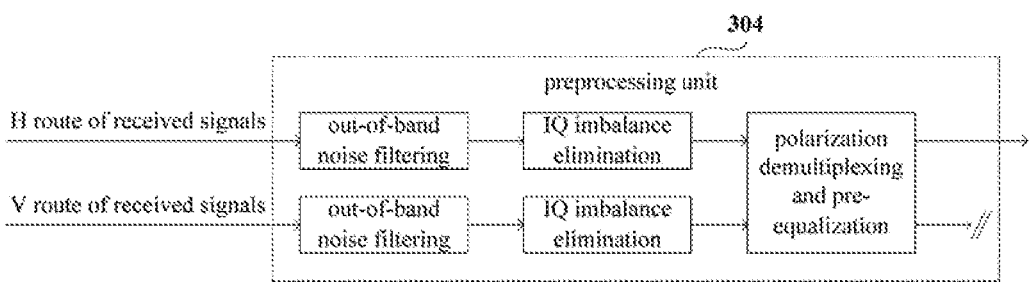
FIG. 6 is a schematic diagram of another implementation of the preprocessing unit.

FIG. 6 is a schematic diagram of another implementation of the preprocessing unit 304. As shown in FIG. 6, the received signals of the receiver are two routes, H and V routes, of signals. Out-of-band noise filtering, IQ imbalance elimination, polarization demultiplexing and pre-equalization may be performed in succession in the receiver, then one of the H route and the V route may be discarded. The reserved route of signal is taken as output of the preprocessing unit 304.

The preprocessing unit 304 is described above in brief by way of two examples only, and other methods for preprocessing the receiving sequence are not excluded in this embodiment. And in this embodiment, the preprocessing unit 304 is optional, and in particular implementation, the receiving sequence may not be preprocessed, and the above autocorrelation operations may directly be performed on the receiving sequence.

In this embodiment, the delay correlation processing unit 301 may perform autocorrelation operations of different delay amounts on the receiving sequence, the delay amounts being integral multiples of the period m of the periodic training sequence, respectively. As shown in FIG. 3, the delay correlation processing unit 301 may perform delay autocorrelations of one period, two periods, . . . , k periods on the receiving sequence, respectively.

In this embodiment, if the received signal is expressed as $S_n = \tilde{S}(nT)$, wherein n is a serial number of each data in the received signal, its delay autocorrelations of k periods may be expressed as:

$$C_n^k = <S_n \cdot S^*_{n+k \cdot m}>;$$

where, T is a symbol period, $<\cdot>$ denotes calculating a mean value, $(\cdot)^*$ denotes a complex conjugate, and k is a number of delay periods. As a total number of periods is N, k may be any value in an interval [1, N-1], and a value of k is not limited in this embodiment.

The k delay correlation sequences parallelly calculated by the above formula are not correlated with each other in data symbols, but relatively large peak values will occur in the part of training sequence, and by using such a feature, a correlation peak value calculated by using k correlation sequences has a signal to noise ratio higher than that of a correlation peak value calculated by using one correlation sequence only, hence, the anti-noise characteristic is better.

By parallelly performing autocorrelation operations of different delay amounts on the training sequence by the delay correlation processing unit 301, the characteristic of multi-period repetition of the training sequence is utilized to a maximum extent, thereby bringing improvement of the anti-noise characteristic.

In this embodiment, after the multi-period delay correlation operations, the parallel correlation sequences are inputted into the superimposition processing unit 302, which may perform superimposition on these correlation sequences, the superimposed outputted sequence being referred to as a synchronization correlation sequence. And as the synchronization correlation sequence may definitely indicate the position of the training sequence, it may be taken as an important reference for extracting the synchronization position.

In this embodiment, a function of the superimposition processing unit 302 is to synthesize information on k correlation sequences, and calculate a single sequence used for extracting the synchronization position.

In an implementation, the superimposition processing unit 302 may use an amplitude superimposition method to carry out the above superimposition. In this implementation, the superimposition processing unit 302 may add up amplitudes of the above multiple parallel correlation sequences to obtain the single sequence and take it as the synchronization correlation sequence.

For example, the amplitudes of the above k correlation sequences are directly added up to obtain the single sequence, which is expressed as:

$$C_n = \sum_{i=1}^{k} \text{abs}(C_n^i).$$

As maximum values of the amplitudes of the k correlation sequences will occur at the synchronization position, such an amplitude superimposition method may increase a signal to noise ratio of the synchronization position.

In another implementation, the superimposition processing unit 302 may perform complex conjugate multiplication on two neighboring correlation sequences in the multiple parallel correlation sequences, and then add up all values to obtain the single sequence and take it as the synchronization correlation sequence.

This implementation is to use a principle that a phase difference between $C_n^i$ and $C_n^{i-1}$ is theoretically constant to perform complex co-phase superimposition, which is expressed as:

$$C_n = \sum_{i=1}^{k-1} C_n^{i+1} \cdot (C_n^i)^*.$$

Such a co-phase superimposition method may also maintain the maximum values of the correlation sequences at the synchronization position, thereby increasing the signal to noise ratio, and enhancing the anti-noise characteristic of the synchronization.

In this embodiment, the synchronization correlation sequence outputted by the superimposition processing unit 302 is inputted into the synchronization extracting unit 303, the synchronization position of the training sequence may be obtained, thereby the training sequence may be obtained accordingly. In this embodiment, the synchronization extracting unit 303 judges the synchronization position based on the single sequence outputted by the superimposition processing unit 302. As the synchronization position is reflected as a maximum value in the single sequence, in an implementation, the synchronization extracting unit 303 may directly position the maximum value of the sequence and take it as the synchronization position, that is, taking the maximum value of the above synchronization correlation sequence as the synchronization position of the training sequence. And in another implementation, the synchronization extracting unit 303 may find center of gravity of several secondary large values near the maximum value of the sequence and take it as the synchronization position, that is, taking center of gravity of all values within a predetermined range of the maximum value of the above synchronization correlation sequence as the synchronization position of the training sequence.

With the apparatus of this embodiment, the anti-noise characteristic of the training sequence is outstandingly improved by using the periodic training sequence, which may not only ensure the synchronization performance of the training sequences, but also reduce influence of non-ideal factors on the estimated value.

Embodiment 3

An embodiment of this disclosure provides an apparatus for estimating a channel spacing.

Within a bandwidth range of a receiver, in addition to a center channel needing to be demodulated, information on left and right neighboring channels received at the same time is also included. As a receiving bandwidth is limited, only parts of the information on the left and right neighboring channels are received. As frequency spectra of the neighboring channels are incomplete, a spacing between central wavelengths of the two channels, that is, a channel spacing, cannot be directly judged. In this embodiment, information on training sequences of the center channel and the neighboring channel are used to estimate frequency offsets of the two channels respectively, so as to estimate the channel spacing from a difference between the frequency offsets of the two channels.

Figure 7:
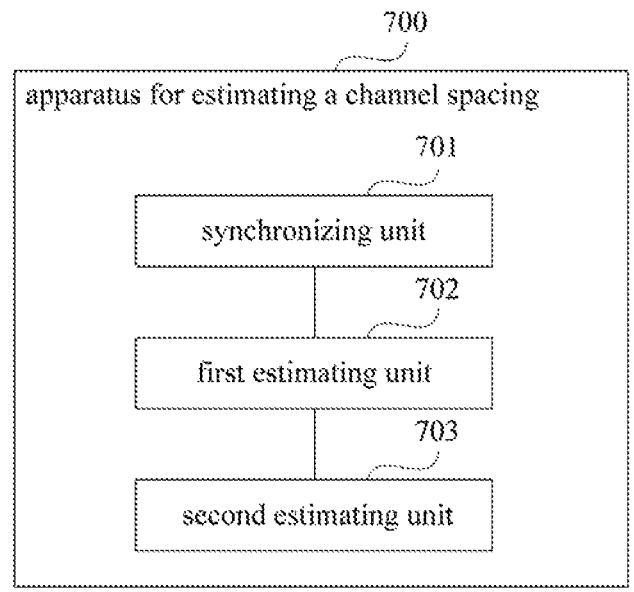
FIG. 7 is a schematic diagram of the apparatus for estimating a channel spacing of Embodiment 3.

FIG. 7 is a schematic diagram of the apparatus 700 for estimating a channel spacing. As shown in FIG. 7, the apparatus 700 includes a synchronizing unit 701, a first estimating unit 702 and a second estimating unit 703.

The synchronizing unit 701 is configured to synchronize a training sequence of a center channel within a bandwidth range of the receiver to obtain a synchronization position of the training sequence of the center channel, and synchronize a training sequence of a neighboring channel within the bandwidth range of the receiver to obtain a synchronization position of the training sequence of the neighboring channel. In this embodiment, the synchronizing unit 701 may be carried out by the training sequence synchronization apparatus 300 in Embodiment 2.

For example, for the synchronization of the training sequence of the center channel, the synchronizing unit 701 may parallelly perform autocorrelation operations of different delay amounts on a receiving sequence of the center channel containing a periodic training sequence to obtain multiple parallel correlation sequences, perform a superimposition operation on the multiple parallel correlation sequences to obtain a synchronization correlation sequence, and perform a synchronization position extraction on the synchronization correlation sequence to obtain a synchronization position of the training sequence of the center channel.

For another example, for the synchronization of the training sequence of the neighboring channel, the synchronizing unit 701 may parallelly perform autocorrelation operations of different delay amounts on a receiving sequence of the neighboring channel containing a periodic training sequence to obtain multiple parallel correlation sequences, perform a superimposition operation on the multiple parallel correlation sequences to obtain a synchronization correlation sequence, perform a synchronization position extraction on the synchronization correlation sequence to obtain a synchronization position of the training sequence of the neighboring channel.

As the training sequence synchronization apparatus 300 is described in detail in Embodiment 2, the contents of which are incorporated herein, and shall not be described herein any further.

Figure 8:
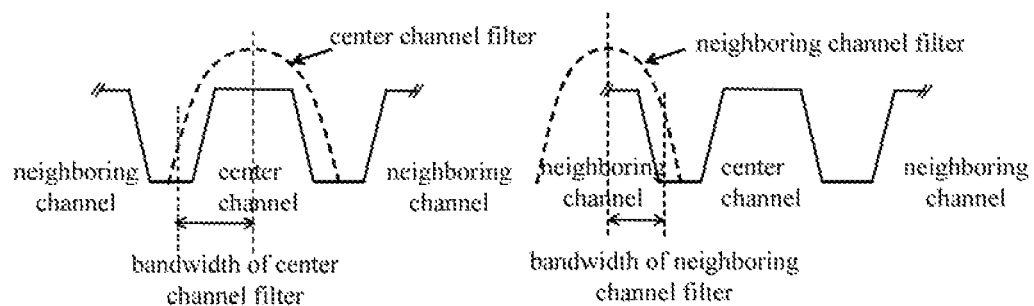
FIG. 8 is a schematic diagram of filtering of a center channel and a neighboring channel.

In this embodiment, based on the synchronizing method used by the synchronizing unit 701, as shown in FIG. 8, filtering may be performed respectively on the center channel and the neighboring channel at the preprocessing unit 304 to eliminate out-of-band noises, so as to obtain the receiving sequence of the center channel and the receiving sequence of the neighboring channel. Thereafter, synchronization processing is respectively performed on the training sequence of the center channel and the training sequence of the neighboring channel, so as to obtain the synchronization position of the center channel and the synchronization position of the neighboring channel. As the synchronization method proposed in this embodiment has a higher anti-noise characteristic, for a neighboring channel of smaller power, the synchronization method proposed in this embodiment shows a better noise tolerance relative to a conventional synchronization method, thereby benefiting the training sequence processing of the neighboring channel, and this is one of application examples that the synchronization method proposed in this embodiment has an enhanced anti-noise characteristic.

In this embodiment, the first estimating unit 702 may estimate a frequency offset of the center channel by using the synchronization position of the training sequence of the center channel obtained by the synchronizing unit 701, and then estimate a frequency offset of the neighboring channel by using the synchronization position of the training sequence of the neighboring channel obtained by the synchronizing unit 701. And a particular estimation method is not limited in this embodiment, and any implementable methods may be applicable to the first estimating unit 702.

In this embodiment, the second estimating unit 703 may estimate the channel spacing by using the above frequency offset of the center channel and frequency offset of the neighboring channel, such as obtaining the channel spacing between the center channel and the neighboring channel through subtraction therebetween.

With the apparatus of this embodiment, the anti-noise characteristic of the training sequence is outstandingly improved by using the periodic training sequence, which may not only ensure the synchronization performance of the training sequence, but also reduce influence of non-ideal factors on the estimated value.

Embodiment 4

Figure 9:
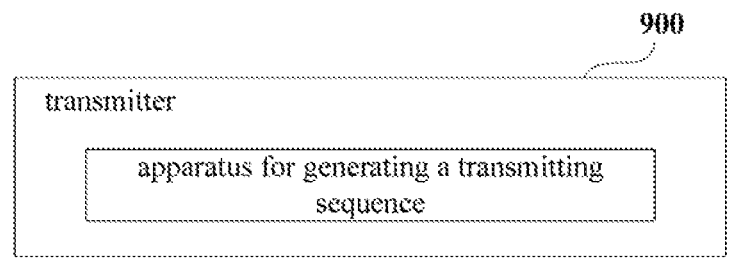
FIG. 9 is a schematic diagram of the transmitter of Embodiment 4.

An embodiment of this disclosure provides a transmitter. FIG. 9 is a schematic diagram of the transmitter. As shown in FIG. 9, the transmitter 900 includes the apparatus for generating a transmitting sequence as described in Embodiment 1. As the apparatus for generating a transmitting sequence has been described in detail in Embodiment 1, the contents of which are incorporated herein, and shall not be described herein any further.

Figure 10:
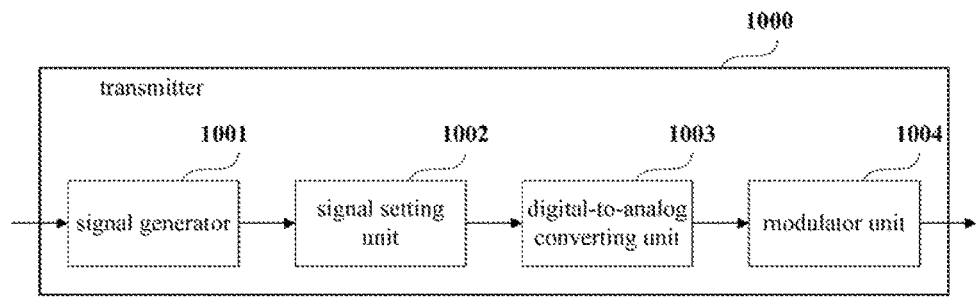
FIG. 10 is a schematic diagram of a systematic structure of the transmitter of Embodiment 4.

FIG. 10 is a schematic diagram of a systematic structure of the transmitter. As shown in FIG. 10, the transmitter 1000 includes a signal generator 1001, a signal setting unit 1002, a digital-to-analog converting unit 1003 and a modulator unit 1004.

The signal generator 1001 generates digital signals according to transmitting data, the signal setting unit 1002 superimposes a periodic training sequence in the generated digital signals, the digital-to-analog converting unit 1003 performs a digital-to-analog conversion on the digital signals, and the modulator unit 1004 takes the signals converted by the digital-to-analog converting unit 1003 as modulation signals to perform modulation.

In this embodiment, the signal setting unit 1002 may be carried out by the apparatus 100 for generating a transmitting sequence in Embodiment 1. The periodic training sequence is described in detail in Embodiment 1, and the contents of which are incorporated herein, and shall not be described herein any further.

The systematic structure of the transmitter shown in FIG. 10 is illustrative only, and in particular implementation, some components may be added or removed as demanded.

With the transmitter of this embodiment, the anti-noise characteristic of the training sequence is outstandingly improved by inserting the periodic training sequence into the transmitting data, which may not only ensure the synchronization performance of the training sequence, but also reduce influence of non-ideal factors on the estimated value.

Embodiment 5

Figure 11:
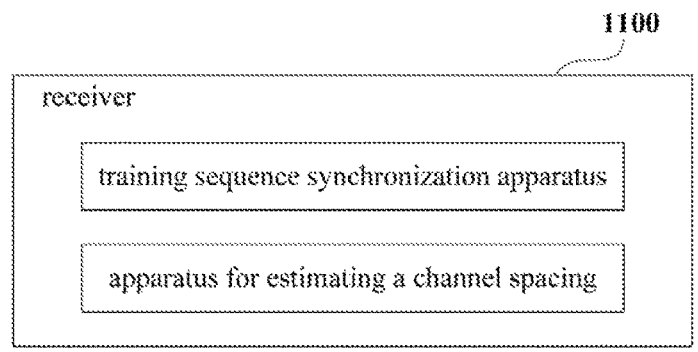
FIG. 11 is a schematic diagram of the receiver of Embodiment 5.

An embodiment of this disclosure further provides a receiver. FIG. 11 is a schematic diagram of the receiver. As shown in FIG. 11, the receiver 1100 includes the training sequence synchronization apparatus as described in Embodiment 2 and/or the apparatus for estimating a channel spacing as described in Embodiment 3. As the training sequence synchronization apparatus 300 and the apparatus 700 for estimating a channel spacing have been described in detail in Embodiment 2 and Embodiment 3, the contents of which are incorporated herein, and shall not be described herein any further.

Figure 12:
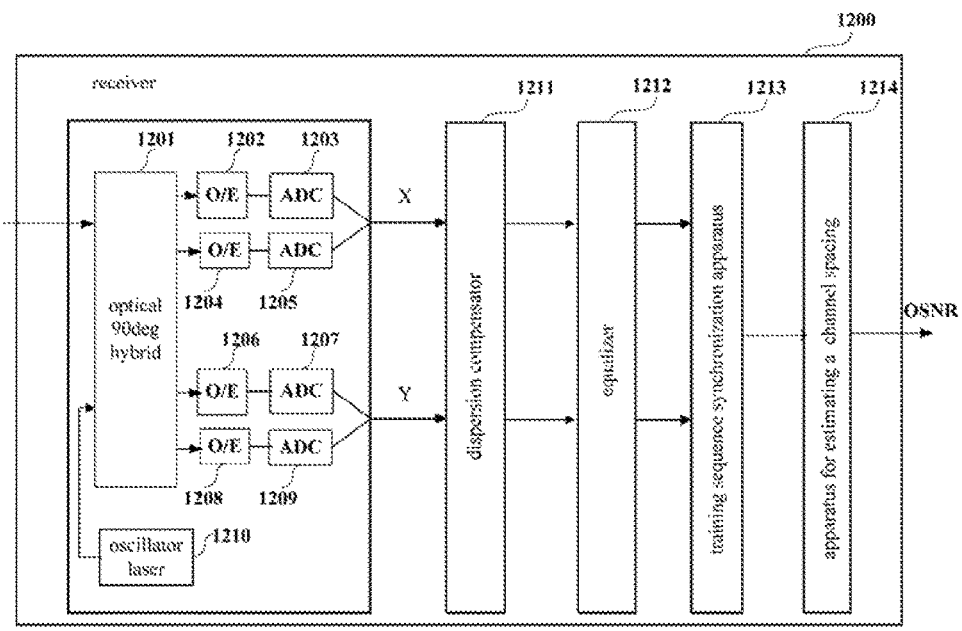
FIG. 12 is a schematic diagram of a systematic structure of the receiver of Embodiment 5.

FIG. 12 is a schematic diagram of a systematic structure of the receiver of the embodiment of this disclosure. As shown in FIG. 12, the receiver 1200 includes:

a front end configured to convert an inputted optical signal into baseband signals in two polarization states, in this embodiment, the two polarization states including an H polarization state and a V polarization state.

As shown in FIG. 12, the front end includes an oscillator laser 1210, an optical 90 deg hybrid 1201, opto-electronic (O/E) detectors 1202, 1204, 1206 and 1208, analog-to-digital converters (ADCs) 1203, 1205, 1207 and 1209, and the receiver 1200 further includes a dispersion compensator 1211, an equalizer 1212 and a training sequence synchronization apparatus 1213 and an apparatus for estimating a channel spacing 1214; wherein, the training sequence synchronization apparatus 1213 and the apparatus for estimating a channel spacing 1214 may have structures and functions identical to those described in Embodiment 2 and Embodiment 3, and shall not be described herein any further; the oscillator laser 1210 is configured to provide a local light source; an optical signal is converted into a baseband signal in a polarization state after passing through the optical 90 deg hybrid 1201, the opto-electronic (O/E) detectors 1202 and 1204 and the analog-to-digital converters (ADCs) 1203 and 1205; and the optical signal is converted into a baseband signal in the other polarization state after passing through the optical 90 deg hybrid 1201, the opto-electronic (O/E) 1206 and 1208 and the analog-to-digital converters (ADCs) 1207 and 1209, with a detailed process being similar to that in the prior art, and being not going to be described herein any further.

Furthermore, if a frequency offset and phase noise have effects on estimation of an OSNR, the receiver 1200 may also include a frequency offset compensator and a phase noise compensator (not shown).

With the receiver of this embodiment, the anti-noise characteristic of the training sequence is outstandingly improved by using characteristic of the periodic training sequence, which may not only ensure the synchronization performance of the training sequence, but also reduce influence of non-ideal factors on the estimated value.

Embodiment 6

Figure 13:
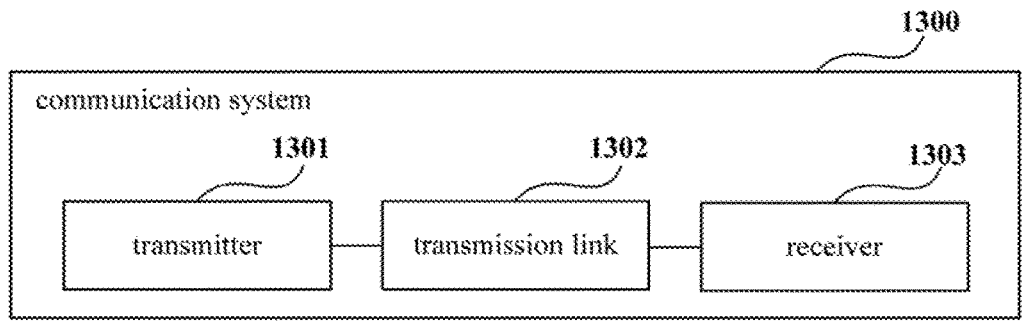
FIG. 13 is a schematic diagram of the communication system of Embodiment 6.

An embodiment of this disclosure further provides a communication system. FIG. 13 is a schematic diagram of the communication system of this embodiment. As shown in FIG. 13, the communication system 1300 includes a transmitter 1301, a transmission link 1302 and a receiver 1303. In this embodiment, a structure and functions of the transmitter 1301 are identical to those in Embodiment 5, and a structure and functions of the receiver 1303 are identical to those in Embodiment 6, which shall not be described herein any further; and the transmission link 1302 may have an existing structure and functions, which are not limited in the embodiment of this disclosure.

With the communication system of this embodiment, the anti-noise characteristic of the training sequence is outstandingly improved by using characteristic of the periodic training sequence, which may not only ensure the synchronization performance of the training sequence, but also reduce influence of non-ideal factors on the estimated value.

Embodiment 7

An embodiment of this disclosure further provides a method for generating a transmitting sequence, applicable to a transmitter in a communication system. As principles of the method are similar to that of the apparatus in Embodiment 1, the implementation of the apparatus in Embodiment 1 may be referred to for implementation of the method, with identical parts being not going to be described herein any further.

Figure 14:
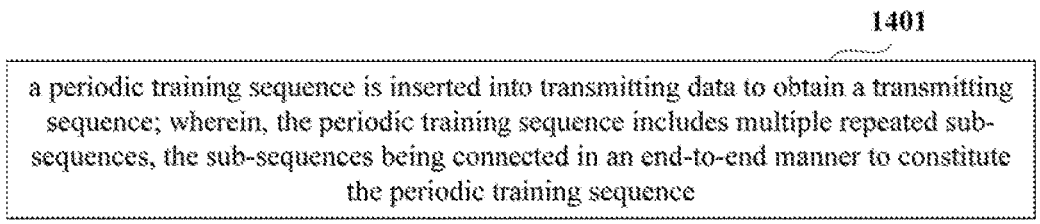
FIG. 14 is a schematic diagram of the method for generating a transmitting sequence of Embodiment 7.

FIG. 14 is a flowchart of the method for generating a transmitting sequence of the embodiment. Referring to FIG. 14, the method includes:

step 1401: a periodic training sequence is inserted into transmitting data to obtain a transmitting sequence; wherein, the periodic training sequence includes multiple repeated sub-sequences, the sub-sequences being connected in an end-to-end manner to constitute the periodic training sequence.

In this embodiment, the periodic training sequence may be a part of whole training sequence, and may also be all of the whole training sequence, only if it is ensured that the training sequence contains some sections of periodic sub-sequences.

In this embodiment, as the training sequence inserted into the transmitting data contains the periodic training sequence, thus the anti-noise characteristic of the training sequence is outstandingly improved, which may not only ensure the synchronization performance of the training sequence, but also reduce influence of non-ideal factors on the estimated value.

Embodiment 8

An embodiment of this disclosure further provides a training sequence synchronization method, applicable to a receiver in a communication system. As principles of the method are similar to that of the apparatus in Embodiment 2, the implementation of the apparatus in Embodiment 2 may be referred to for implementation of the method, with identical parts being not going to be described herein any further.

Figure 15:
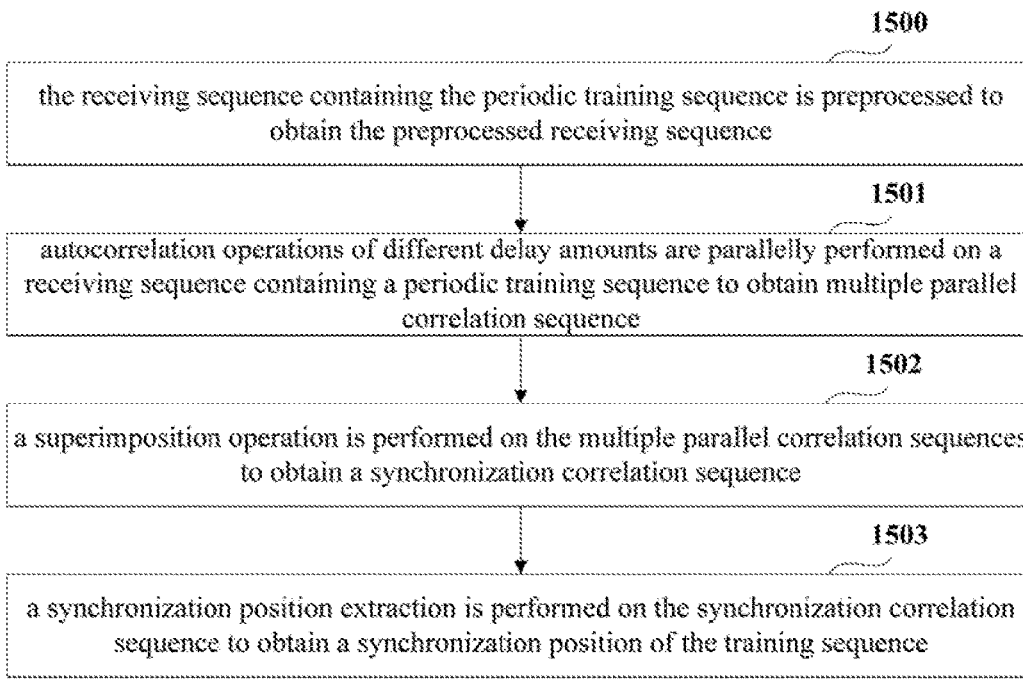
FIG. 15 is a schematic diagram of the training sequence synchronization method of Embodiment 8.

FIG. 15 is a flowchart of the training sequence synchronization method of the embodiment. Referring to FIG. 15, the method includes:

step 1501: autocorrelation operations of different delay amounts are parallelly performed on a receiving sequence containing a periodic training sequence to obtain multiple parallel correlation sequences;

step 1502: a superimposition operation is performed on the multiple parallel correlation sequences to obtain a synchronization correlation sequence; and step 1503: a synchronization position extraction is performed on the synchronization correlation sequence to obtain a synchronization position of the training sequence.

In step 1501, the above different delay amounts are integral multiples of period of the training sequence, respectively.

In step 1502, amplitudes of the multiple parallel correlation sequences may be added up to obtain a single sequence as the synchronization correlation sequence, and complex conjugate multiplication may be performed on two neighboring correlation sequences in the multiple parallel correlation sequences, and then all values are added up to obtain a single sequence as the synchronization correlation sequence.

In step 1503, a maximum value of the synchronization correlation sequence may be taken as the synchronization position of the training sequence, and center of gravity of all values within a predetermined range of the maximum value of the synchronization correlation sequence may also be taken as the synchronization position of the training sequence.

In this embodiment, before step 1501, the method may further include:

step 1500: the receiving sequence containing the periodic training sequence is preprocessed to obtain the preprocessed receiving sequence.

With the method of this embodiment, the anti-noise characteristic of the training sequence is outstandingly improved by using characteristic of the periodic training sequence, which may not only ensure the synchronization performance of the training sequence, but also reduce influence of non-ideal factors on the estimated value.

Embodiment 9

An embodiment of this disclosure further provides a method for estimating a channel spacing, applicable to a receiver in a communication system. As principles of the method are similar to that of the apparatus in Embodiment 3, the implementation of the apparatus in Embodiment 3 may be referred to for implementation of the method, with identical parts being not going to be described herein any further.

Figure 16:
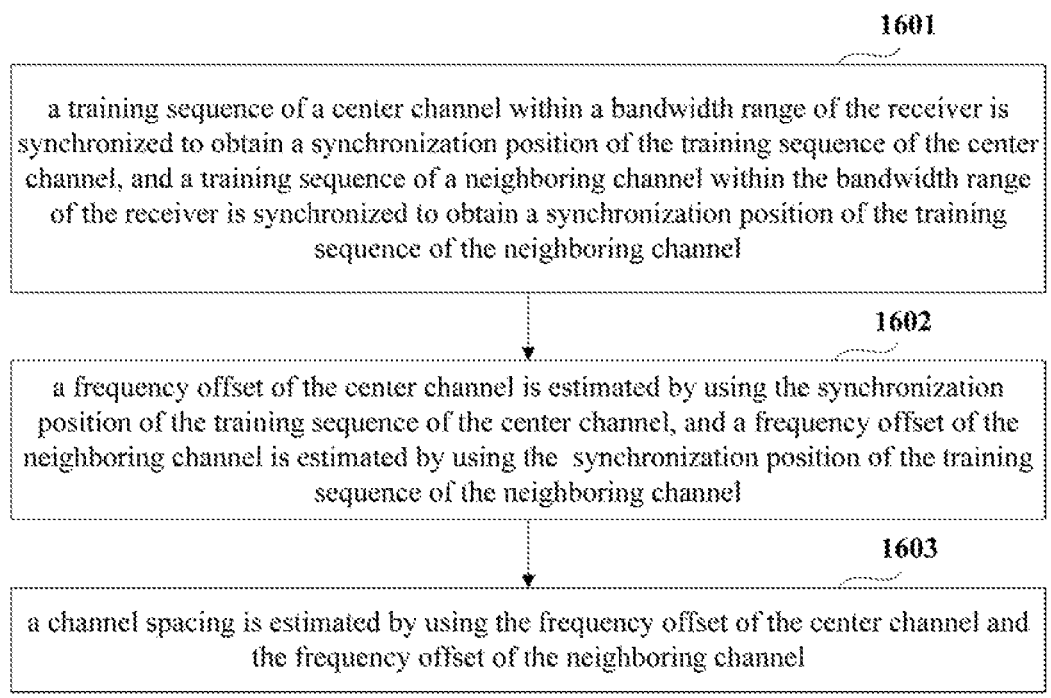
FIG. 16 is a schematic diagram of the method for estimating a channel spacing of Embodiment 9.

FIG. 16 is a flowchart of the method for estimating a channel spacing. Referring to FIG. 16, the method includes:

step 1601: a training sequence of a center channel within a bandwidth range of the receiver is synchronized to obtain a synchronization position of the training sequence of the center channel, and a training sequence of a neighboring channel within the bandwidth range of the receiver is synchronized to obtain a synchronization position of the training sequence of the neighboring channel;

step 1602: a frequency offset of the center channel is estimated by using the synchronization position of the training sequence of the center channel, and a frequency offset of the neighboring channel is estimated by using the synchronization position of the training sequence of the neighboring channel; and step 1603: a channel spacing is estimated by using the frequency offset of the center channel and the frequency offset of the neighboring channel.

In this embodiment, step 1601 may be carried out by the method of Embodiment 8, the contents of which being incorporated herein, and being not going to be described herein any further.

With the method of this embodiment, the anti-noise characteristic of the training sequence is outstandingly improved by using characteristic of the periodic training sequence, which may not only ensure the synchronization performance of the training sequence, but also reduce influence of non-ideal factors on the estimated value.

An embodiment of the present disclosure provides a computer readable program code, which, when executed in a transmitter, will cause the transmitter to carry out the method as described in Embodiment 7.

An embodiment of the present disclosure provides a computer readable medium, including a computer readable program code, which will cause a transmitter to carry out the method as described in Embodiment 7.

An embodiment of the present disclosure provides a computer readable program code, which, when executed in a receiver, will cause the receiver to carry out the method as described in Embodiment 8 or Embodiment 9.

An embodiment of the present disclosure provides a computer readable medium, including a computer readable program code, which will cause a receiver to carry out the method as described in Embodiment 8 or Embodiment 9.

The above apparatuses and methods of the present disclosure may be implemented by hardware, or by hardware in combination with software. The present disclosure relates to such a computer-readable program that when the program is executed by a logic device, the logic device is enabled to carry out the apparatus or components as described above, or to carry out the methods or steps as described above. The present disclosure also relates to a storage medium for storing the above program, such as a hard disk, a floppy disk, a CD, a DVD, and a flash memory, etc.

The present disclosure is described above with reference to particular embodiments. However, it should be understood by those skilled in the art that such a description is illustrative only, and not intended to limit the protection scope of the present disclosure. Various variants and modifications may be made by those skilled in the art according to the principles of the present disclosure, and such variants and modifications fall within the scope of the present disclosure.

What is claimed is:

1. A training sequence synchronization apparatus, comprising:
   a memory that stores a plurality of instructions; and
   a processor coupled to the memory and configured to execute the instructions to:
     parallelly perform autocorrelation operations of different delay amounts on a receiving sequence containing a periodic training sequence to obtain multiple parallel correlation sequences;
     perform a superimposition operation on the multiple parallel correlation sequences to obtain a synchronization correlation sequence; and
     perform a synchronization position extraction on the synchronization correlation sequence to obtain a synchronization position of the training sequence, wherein the different delay amounts are integral multiples of a period of the training sequence, respectively.

2. The apparatus according to claim 1, wherein the processor is configured to execute the instructions to add up amplitudes of the multiple parallel correlation sequences to obtain a single sequence as the synchronization correlation sequence.

3. The apparatus according to claim 1, wherein to perform the superimposition operation, the processor is configured to execute the instructions to:
perform a complex conjugate multiplication on two neighboring correlation sequences in the multiple parallel correlation sequences; and
add up all values, obtained by performing the complex conjugate multiplication on the two neighboring correlation sequences in the multiple parallel correlation sequences, to obtain a single sequence as the synchronization correlation sequence.

4. The apparatus according to claim 1, wherein the processor is configured to execute the instructions to take a maximum value of the synchronization correlation sequence as the synchronization position of the training sequence.

5. The apparatus according to claim 1, wherein the processor is configured to execute the instructions to take a center of gravity of all values within a predetermined range of a maximum value of the synchronization correlation sequence as the synchronization position of the training sequence.

6. The apparatus according to claim 1, wherein the processor is further configured to execute the instructions to:
preprocess the receiving sequence containing the periodic training sequence to obtain the preprocessed receiving sequence.

7. The apparatus according to claim 1, wherein the periodic training sequence comprises multiple repeated sub-sequences, the sub-sequences being connected to each other in an end-to-end manner to constitute the periodic training sequence.

8. The apparatus according to claim 1, wherein the periodic training sequence is a part of or all of whole training sequence.

9. An apparatus for estimating a channel spacing, comprising:
a memory that stores a plurality of instructions; and
a processor coupled to the memory and configured to execute the instructions to:
parallelly perform autocorrelation operations of different delay amounts on a receiving sequence of a center channel containing a periodic first training sequence to obtain multiple parallel first correlation sequences;
perform a superimposition operation on the multiple parallel first correlation sequences to obtain a first synchronization correlation sequence;
perform a synchronization position extraction on the first synchronization correlation sequence to obtain a synchronization position of the first training sequence of the center channel;
parallelly perform autocorrelation operations of different delay amounts on a receiving sequence of a neighboring channel containing a periodic second training sequence to obtain multiple parallel second correlation sequences;
perform a superimposition operation on the multiple parallel second correlation sequences to obtain a second synchronization correlation sequence;
perform a synchronization position extraction on the second synchronization correlation sequence to obtain a synchronization position of the second training sequence of the neighboring channel;
estimate a frequency offset of the center channel by using the synchronization position of the first training sequence of the center channel, and estimate a frequency offset of the neighboring channel by using the synchronization position of the second training sequence of the neighboring channel; and
estimate the channel spacing by using the frequency offset of the center channel and the frequency offset of the neighboring channel.

* * * * *